M. A. MARQUETTE.
INNER TUBE AND METHOD OF MAKING THE SAME.
APPLICATION FILED SEPT. 19, 1919.
1,428,382.  Patented Sept. 5, 1922.
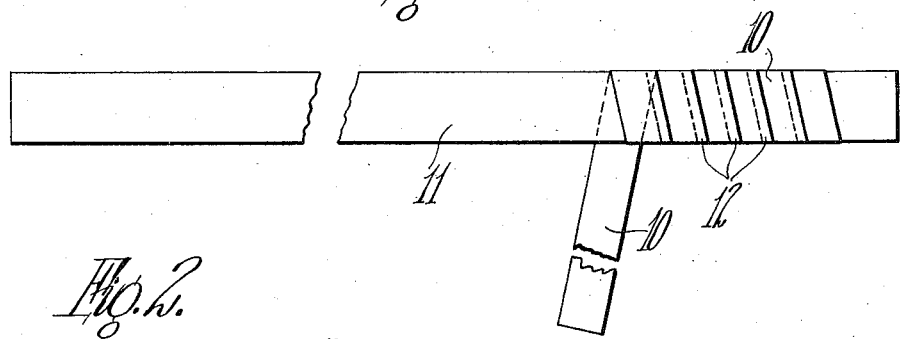
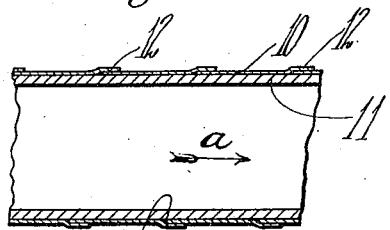
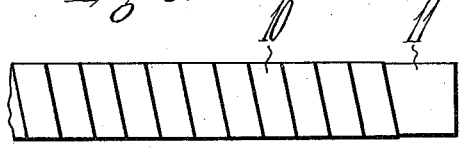
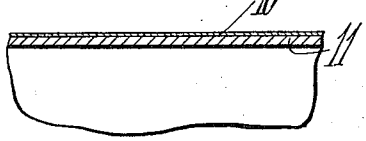
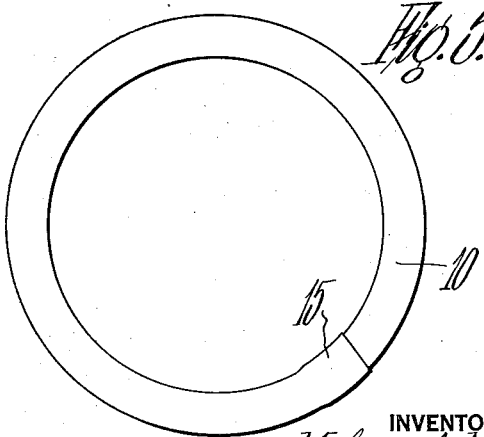
INVENTOR
Melvon A. Marquette
BY Chapin & Neal
ATTORNEYS.

Patented Sept. 5, 1922.

1,428,382

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

INNER TUBE AND METHOD OF MAKING THE SAME.

Application filed September 19, 1919. Serial No. 324,846.

*To all whom it may concern:*

Be it known that I, MELVON A. MARQUETTE, a citizen of the United States of America, residing at Chicopee Falls, in the county of Hampden and State of Massachusetts, have invented certain new and useful Improvements in Inner Tubes and Methods of Making the Same, of which the following is a specification.

My present invention relates to rubber tubes, particularly those utilized as inner tubes for pneumatic tires; and to methods of making the same.

It has for its object the equalization of the stresses existing in an inner tube, thereby increasing the efficiency and the life of the tube. It has for a further object a tube which will shape itself more nearly to the inside of the tire casing than is the case with tubes now known. It has for a further object the improvement of inner tubes generally.

My invention will now be described with particular reference to the accompanying drawings, in which—

Fig. 1 is a view showing the method of applying the rubber stock to the mandrel;

Fig. 2 is an enlarged sectional view showing the disposition of the stock;

Fig. 3 is a view similar to Fig. 1 showing the method of wrapping the tube to expel the entrapped air prior to vulcanization;

Fig. 4 is a sectional detail showing the union of the successive courses of rubber stock after they have been pressed together by the wrapping; and Fig. 5 is a view of the completed tube.

Rubber inner tubes are usually made from rubber stock which is formed between the rolls of a calender. Stock so made has a distinct grain running in the direction of its length (tangentially to the circumference of the rolls) and is stronger in this direction than in that at right angles thereto. In forming a tube by known processes a strip is cut longitudinally of the long sheet made on the calender, or the calender fitted to deliver narrow strips, and this strip is rolled about a mandrel or pole, a joint running longitudinally the whole length of the mandrel. In this construction the grain of the rubber runs lengthwise of the mandrel, and hence circumferentially of the tube when the ends of the latter are joined (Fig. 5). The greatest strength of the rubber is accordingly in that direction, whereas the strain exerted by inflation is both in that direction and at right angles thereto. This, of course, departs from the ideal condition, in which the strains are distributed equally in all directions.

According to my invention, a narrow strip 10 with the grain running longitudinally thereof is wound helically about a mandrel 11, as shown in Figs. 1 and 2, leaving a plurality of lap joints 12. One end of the spiral tube so formed is then preferably secured to the mandrel as by tape 13, and a strip of fabric 14, is then tightly wound helically throughout the length of the tube. The tube may then be vulcanized in any suitable way.

Preferably, however, the tube is slightly heated with the fabric still in place, thus allowing the rubber time to flow and smooth out the joints, the second end of the tube is taped to the mandrel, and the wrapping removed before vulcanization. I have found that this process gives a tube which is perfectly integral throughout its length, and having no visible seams where the rubber contacts with the mandrel. To prepare the vulcanized tube for use it is preferably turned inside out so that its smooth side is outermost, and its ends joined at 15 in any desired way.

It will be found that a tube so constructed will possess many novel characteristics. Due to the fact that the grain of the rubber runs spirally or at approximately forty-five degrees to the length of the tube, the longitudinal and transverse strains will affect the tube more nearly evenly than was the case with former tubes. The tubes made according to my process have another property which aids the tube in fitting closely and without crimping in the case when inflated. This lies in the fact that the tube, with the ends joined as shown in Fig. 5, can be made to go through a vertical movement by turning any point of the tube, and this movement is produced with but the slightest effort. In the case of former tubes this could be accomplished only with difficulty, the tube buckling to some extent rather than responding to the rotating impulse. I believe that this characteristic aids materially in allowing the tube to seat properly in a casing.

Preferably the direction in which the fabric strip is wound in the reverse of that in which the rubber is wound, as this causes pressure to be exerted against the joints substantially in the direction of the arrow *a* in Fig. 2, thus causing the rubber to flow to reduce the joint to the thickness of the body of the tube and the air to be expelled from the pocket 16 formed at the joint.

I claim—

1. A rubber tube composed of a helical strip of rubber arranged with its successive helices forming lapped joints, said joints being pressed to substantially the same thickness as the body of the tube.

2. The method of making rubber tubes consisting in winding a strip of rubber helically about a mandrel with the successive turns of the strip having their edges overlapped, pressing the tube so formed against the mandrel, and vulcanizing the tube, whereby a vulcanized tube is produced in which the lapped joints are reduced to the same thickness as the body of the tube.

3. The method of making rubber tubes consisting in winding a strip of rubber helically about a mandrel with the successive turns of the strip having their edges overlapped, temporarily compressing the tube so formed against the mandrel by means of a strip of fabric wound helically about the tube so formed in a direction opposite to that of the rubber strip, and vulcanizing the tube.

MELVON A. MARQUETTE.